United States Patent [19]

Tao

[11] Patent Number: 4,463,809

[45] Date of Patent: Aug. 7, 1984

[54] METHOD FOR REGENERATING BRINE

[75] Inventor: Fan-Sheng Tao, Morro Bay, Calif.

[73] Assignee: Texaco Inc., White Plains, N.Y.

[21] Appl. No.: 388,294

[22] Filed: Jun. 14, 1982

[51] Int. Cl.$^3$ .............................................. C02F 1/42
[52] U.S. Cl. .................................... 166/303; 210/677; 210/687
[58] Field of Search ............... 210/664, 670, 677, 687; 423/181, 182, 499; 166/272, 303

[56] References Cited

U.S. PATENT DOCUMENTS

| | | | |
|---|---|---|---|
| 2,676,922 | 4/1954 | Waisbrot | 210/687 |
| 3,056,651 | 10/1962 | McIlhenny et al. | 210/677 |
| 3,528,912 | 9/1970 | Popper et al. | 210/677 |
| 3,977,968 | 8/1976 | Odland | 210/677 |
| 4,083,782 | 4/1978 | Kunin | 210/687 |

Primary Examiner—Ivars C. Cintins
Attorney, Agent, or Firm—Robert A. Kulasen; Martin M. Glazer; James J. O'Loughlin

[57] ABSTRACT

The present invention is for a method of regenerating diluted brine containing hardness from a water softening process. The process includes the steps of contacting the diluted brine with a weak acid ion exchange resin to remove the hardness from the brine and evaporating part of the water from the brine using heat from a production casing gas. The production casing gas comes from a producing oil well of a steam injection secondary oil recovery process. The regenerated brine can then be used to regenerate further quantities of strong acid resin which are used to soften water. The softened water can be used for making steam for use in a steam injection secondary oil recovery process.

4 Claims, No Drawings

METHOD FOR REGENERATING BRINE

BACKGROUND OF THE INVENTION

1. Field of the Invention

This invention relates to an improved method for regenerating of brine and more particularly, for the use of waste heat from a producing oil well to aid in the regeneration of the brine.

2. Description of the Prior Art

In many processes of softening hard water, the hard water, generally water having calcium and/or magnesium salts dissolved therein, is contacted with a strong acid ion exchange resin. Ion exchange resins can be minerals such as zeolite or, now more commonly, various synthetic resins. The resins soften the hard water by exchanging the calcium and/or magnesium ions for sodium and/or potassium ions. Softened hard water is desirable in many instances, since hard water produces undesirable results in many uses, such as forming scale or other deposits during the production of steam in a steam generating device. The sodium and potassium salts do not have the same effects and are not generally deleterious to devices or methods employing the softened water.

Once the ion exchange resin has been effectively depleted of sodium or potassium ions during the water softening process, the ion exchange resin is generally regenerated by contacting the exhausted ion exchange resin with brine. The sodium ions in the brine exchange for the calcium and/or magnesium ions of the exhausted ion exchange resin. This regenerates the ion exchange resin and permits the ion exchange resin to soften further quantities of hard water. Methods and apparatus for softening water and regenerating the ion exchange resin are set forth in many patents including U.S. Pat. Nos. 4,207,397; 3,899,421; and 3,616,912.

In many previously used water softening processes, the brine was simply disposed of after it had regenerated the ion exchange resin. However, this presents two problems, one is that when large quantities of ion exchange resin are to be regenerated, the cost of the brine increases greatly. Further, with environmental regulations, disposal of large quantities of brine is becoming more and more difficult and more and more expensive because of the deleterious effects of the brine both on soil and on local water supplies. For these reasons and others, attempts have been made to regenerate brine, generally, by removing the calcium and/or magnesium ions from the brine.

Representative chemical methods for precipitating out the calcium and/or magnesium ions from the used brine are set forth in U.S. Pat. Nos. 3,977,968 and 3,528,912. However, the use of chemicals to precipitate out calcium and/or magnesium ions requires the use of relatively expensive chemicals. There are also problems in removing the precipitate from the brine solution, and in disposing of the precipitated material.

Another problem in regenerating the brine used in a water softening system results from the fact that the brine is diluted during the regeneration of the strong acid ion exchange resin. The dilution of the brine generally results from the addition of water used to wash the strong acid ion exchange resin. The concentration of the sodium chloride in the diluted brine must be brought up to a desired concentration, preferably about 10 percent by weight, during any brine regeneration process.

One use for softened water is in the secondary recovery of oil. One method of recovering oil from underground reservoirs, which is not otherwise readily recovered, comprises drilling into the oil bearing formations and injecting steam into the formations. The steam heats the viscous oil, making it easier to bring the oil to the surface. A steam injection process for oil recovery is disclosed in U.S. Pat. Nos. 3,237,692 and 3,193,009.

Steam injection methods require large quantities of water. Boiling hard water to form steam results in many problems, such as the formation of scale in the boilers which is associated with the calcium and/or magnesium ions found in hard water. The large quantities of softened water required result in large quantities of brine being used to regenerate the resins which are used to soften the hard water.

SUMMARY OF THE INVENTION

A method now has been found for regenerating the hardness containing, diluted brine which was used to regenerate a strong acid ion exchange resin from a water softening system. The method comprises the steps of contacting the diluted hardness containing brine with a weak acid ion exchange resin to remove the hardness from the brine, and evaporating a part of the water from the diluted brine until a desired concentration of sodium chloride in the brine is achieved. Alternately, the diluted hardness containing brine can be concentrated by evaporation prior to contact with the weak acid ion exchange resin. The heat used to concentrate the diluted brine comes from production casing gas from a producing well of a secondary oil recovery process using steam injection.

The previous problems associated with regenerating the brine not only included the problem of removing the hardness, either by precipitation or the use of an ion exchange resin, but also of concentrating the brine, since the brine was generally diluted during the strong acid ion exchange resin regeneration process. The excess water must be removed, since only brines of certain concentrations are useful for regenerating the strong acid ion exchange resins. The waste heat, in the form of production casing gas from an oil well of an oil field using steam injection to recover the oil can be utilized. The temperature of this gas is generally above the boiling point of water, and can evaporate sufficient water from the diluted brine to make the present method of regenerating brine economically viable.

PREFERRED EMBODIMENT OF THE INVENTION

In the preferred embodiment of the present invention, the method of regenerating the diluted hardness containing brine comprises a portion of a water softening process which is used to supply soft water for a steam injection process used for recovering oil from an underground oil bearing formation. Generally, a water softening system comprises a source of water, whether underground, surface or recycled water, which contains sufficient hardness to make it desirable to soften the water prior to evaporating it into steam and injecting the steam into the oil bearing formation. The hard water is optionally filtered to remove insoluble material and then passed into a vessel which contains an ion exchange resin, generally a strong acid ion exchange resin, which is able to exchange the hardness, the calcium and/or magnesium ions, present in the hard water for sodium ions. The softened water is then conventionally passed into a steam generator, wherein the softened water is boiled, steam is produced, and the steam is then injected into the oil bearing formation.

After the ion exchange resin has exchanged its sodium ions for the calcium and/or magnesium ions, the resin is regenerated. Regeneration can be conventionally accomplished by backwashing water through the ion exchange resin to remove hard water and any percipitates or other material which should be washed out. Brine is then passed through the ion exchange resin, where due to the great excess of sodium ions in the brine as compared to the hardness ions, the calcium and/or magnesium ions are exchanged for sodium ions. The strong acid ion exchange resin is then washed to remove the brine. The strong acid ion exchange resin is then ready to soften fresh quantities of hard water.

Previously, the brine solution was used until the hardness ions in the brine exceeded a certain level where their concentration was so high, as compared to the sodium ions in the brine, that the ion exchange resin could no longer satisfactorily exchange the hardness ions for the sodium ions. In a water softening process generally used for the formation of steam for injection into oil bearing formations, the quantity of hardness in the spent brine was between about 4,000 and about 18,000 parts per million by weight expressed as calcium carbonate with the average level being about 12,000 parts per million by weight.

In the present invention the spent brine, instead of being disposed of, is regenerated by contacting the spent brine with a weak acid resin. The weak acid resin removes a large portion of the calcium and/or magnesium ions from the spent brine solution. Weak acid resins are able to remove sufficient calcium and/or magnesium ions from the spent brine to reduce the concentration of hardness, as measured as calcium carbonate, to generally less than about 300 parts per million by weight. At such a concentration of hardness, the regenerated brine is readily used for regeneration of the strong acid ion exchange resins used for water softening.

The brine, after regeneration of the strong acid resins and after being regenerated by the weak acid resin, is generally too dilute to be used as such. Generally, the diluted brine has less than about 10 percent by weight of sodium chloride and generally between about 0.5 and less than about 10 percent by weight. At such low concentrations, the brine cannot readily be used for regeneration of the strong acid ion exchange resins. Simply adding further quantities of salt to the diluted brine to increase the sodium chloride concentration is a expensive process and further, rapidly increases the volume of brine that must be handled. At one point the volume becomes too large to be usable. For this reason the preferred method of increasing the concentration of the diluted brine is to evaporate water from the brine. Since the energy required for the evaporation of water from the diluted brine is large, the cost of such energy can easily surpass the cost of replacing the brine and disposing of the spent brine.

However, it now has been discovered that the production casing gas from a producing well of an oil field using a steam injection method of oil recovery, wherein the production casing gas is the gas that comes up along with the oil from the well and which is at a temperature above 100° C., generally at a temperature between 125° and 175° C., can be used to concentrate the diluted brine. The production casing gas can be routed into an evaporator, generally a conventional heat exchanger, wherein the gas heats the diluted brine to boiling and causes water to be evaporated from the brine. The concentrated brine can then be used to regenerate exhausted strong acid ion exchange resin.

The weak acid ion exchange resin which is used to remove the hardness from the spent brine is readily regenerated by first contacting the weak acid resin with a strong mineral acid, generally hydrochloric acid. The acidified weak acid ion exchange resin is then treated by the addition of a strong base such as sodium hydroxide. This produces a regenerated weak acid ion exchange resin which can rapidly and easily remove the hardness from the calcium and/or magnesium containing brine. The sodium hydroxide used in the weak acid ion exchange resin regeneration process neutralizes the hydrochloric acid and forms a small quantity of salt (sodium chloride). The salt from the regeneration of the weak acid resin can be much more readily and cheaply disposed of than the large quantities of diluted brine which previously had to be disposed. Further, the cost of the mineral acid and base necessary to regenerate the weak acid resin is smaller, especially in light of the cheaper disposal costs, than the cost of constantly replacing the brine.

The strong acid ion exchange resin useful in the present invention can be a natural resin, such as zeolite or, more preferably, a synthetic resin such as sulfonated styrene-divinylbenzene copolymer or other styrene-divinylbenzene copolymers. Useful strong acid ion exchange resins are sold under the trademark Amberlite IR-116, IR-122 or Amberlite 200 by Rohm and Haas, Philadelphia, PA 19105. Strong acid ion exchange resins with a sulfonic acid functionality are presently preferred.

Weak acid ion exchange resins useful in the present invention include methacrylic acid-divinylbenzene copolymer products. Preferred weak acid ion exchange resins have a carboxylic functionality. Useful weak acid ion exchange resins are sold under the trademarks Amberlite IRC-50 or Amberlite IRC-84 by Rohm and Haas, Philadelphia, PA, 19105. Additional information about the strong acid and the weak acid ion exchange resins, including their uses and regeneration is set forth in the Kirk-Othmer Encyclopedia of Chemical Technology, Third Edition, Volume 13, pages 685 to 699 (John Wiley and Sons, New York, N.Y.).

In the preferred process of the present invention, the brine used to regenerate the strong acid ion exchange resin can have a sodium chloride concentration of between about 8 and 12 percent by weight, with about 10 percent or more by weight being preferred. During the regeneration of the brine, removal of hardness by the weak acid resin does not appreciably increase the sodium chloride concentration which is decreased by the addition of water during the regeneration of the strong acid resin to be between about 0.5 and less than about 10 percent by weight. The concentration of diluted brine is brought up to the preferred about 10 percent or more by weight by evaporation, either before or preferably after regeneration of the brine, by heat from the production casing gas.

The concentration of hardness, as measured as the weight of calcium carbonate, in the spent diluted brine after regeneration of the strong acid ion exchange resin but prior to the regeneration of the brine should be no higher than about 16,000 parts per million by weight, since at higher concentrations the calcium carbonate can produce excessive sludge and jelly within the brine. Regeneration of brine having a smaller concentration of hardness than about 4,000 parts per million by weight as measured by the calcium carbonate, results in an inefficient use of the brine. Preferably, the hardness concentration in the spent brine to be regenerated is about 12,000 parts per million.

The following example is given for illustrative purposes only and is not meant to limit the invention.

EXAMPLE

Hard water containing calcium and/or magnesium ions is strained or filtered and supplied to an ion exchange bed containing a strong acid ion exchange resin of the sytrene-divinylbenzene copolymer type. The ion exchange resin removes calcium and/or magnesium ions from the hard water. The softened water then proceeds to a conventional boiler, wherein the softened water is boiled and turned into steam. The steam is then piped to wells and injected into oil bearing formations to aid in the recovery of oil from those formations. The pressure, temperature and volume of steam necessary will depend on the characteristics of the oil bearing formations.

After exhaustion or in response to a signal from a water hardness detector, the ion exchange resin is regenerated by first backwashing the ion exchange resin with water and then passing an about 10 percent by weight brine solution through the strong acid ion exchange resin. The brine, after regenerating the strong acid ion exchange resin is collected. The spent diluted brine contains about 12,000 parts per million of hardness as measured as the calcium carbonate, and contains less than about 10 percent by weight of sodium chloride. The diluted hardness containing brine is then passed through a weak acid ion exchange resin of the methacrylic acid-divinylbenzene copolymer type having a carboxylic functionality. The weak acid ion exchange resin removes most of the hardness from the brine and then the diluted brine is passed onto an evaporator.

The evaporator, which is a conventional evaporator designed to handle sodium chloride containing solutions having about 10 percent sodium chloride by weight, evaporates water from the diluted brine, thereby concentrating it, by using the heat of a production casing gas passing through a coil within the evaporator. The production casing gas is at a temperature of between about 125° and 175° C. The production casing gas is piped to the evaporator from a producing oil well.

In a producing oil well in an oil field which uses steam injection to aid in the recovery of oil, the oil that is recovered comes out through a central tube and is conventionally removed. Production casing gas is produced from an annular portion which surrounds the central oil carrying tube. The production casing gas comprises a mixture of steam, carbon dioxide, volitile hydrocarbons and possibly minor quantities of other gases. In the present invention, the heat from the production casing gas is used to evaporate water from the diluted brine thereby increasing the sodium chloride concentration of the brine to a useful level. After evaporation of water from the brine, the brine contains about 10 percent or more by weight of sodium chloride with the actual value varying from about 8 to 12 percent by weight. Some residual hardness remains in the regenerated brine, since the weak acid ion exchange resin does not remove all of the hardness, however, this hardness is generally below about 300 parts per million by weight and does not seriously affect the ability of the regenerated brine to regenerate the strong acid resin used for water softening.

The weak acid ion exchange resin, after exhaustion, is regenerated by contacting the resin with a solution of hydrochloric acid. This removes the calcium and/or magnesium ions from the weak acid ion exchange resin and replaces them with hydrogen ions. After this step, the weak acid ion exchange resin is contacted with a sodium hydroxide solution. This neutralizes the acid remaining in the weak acid ion exchange resin. The sodium hydroxide treatment is used to prevent the brine from becoming excessively acidic during its regeneration. The effluent from the regeneration of the weak acid ion exchange resin, which is generally sodium chloride, can be conventionally disposed of such as by discharging to ground water or preferably injection into deep wells. The quantity of effluent from the regeneration of the weak acid ion exchange resin is much smaller in volume than the spent brine which previously had to be disposed. Such a reduction in volume coupled with the reduction in the quantity of sodium chloride which must be constantly added to regenerate the strong acid resin, results in a substantial saving in cost and a substantial reduction in damage to the environment.

The above example is only for illustrative purposes and is not intended to limit the invention in any way, which invention is set forth in the following claims.

What is claimed is:

1. A method of enhanced oil recovery comprising the steps of contacting hard water with a strong acid ion exchange resin; evaporating said softened water into steam and injecting it into an oil bearing formation; regenerating said strong acid ion exchange resin with a brine; then regenerating said diluted hardness containing brine by contacting said brine with a weak acid ion exchange resin, and evaporating water from said diluted brine using the heat from a production casing gas, said production casing gas comprising steam and a gas from the recovered oil, said production casing gas being supplied from a producing oil well of a steam injection oil recovery process; softening further quantities of hard water using said regenerated strong acid ion exchange resin; and regenerating said spent strong acid ion exchange resin using said regenerated brine.

2. The method of claim 1 wherein said regenerated brine comprises about 10 percent or more by weight sodium chloride and less than about 300 parts per million of hardness.

3. The method of claim 1 wherein said diluted hardness containing brine after regenerating said strong acid ion exchange resin and prior to contacting said weak acid ion exchange resin comprises less than about 10 percent by weight of sodium chloride and from about 4,000 to 18,000 parts per million of total hardness.

4. The method of claim 1 wherein said production casing gas being at a temperature of between about 125° and 175° C.

* * * * *